(12) United States Patent
Steyer et al.

(10) Patent No.: US 12,077,161 B2
(45) Date of Patent: Sep. 3, 2024

(54) METHOD AND PROCESSING UNIT FOR DETERMINING INFORMATION WITH RESPECT TO AN OBJECT IN AN ENVIRONMENT OF A VEHICLE

(71) Applicant: Bayerische Motoren Werke Aktiengesellschaft, Munich (DE)

(72) Inventors: Sascha Steyer, Munich (DE); Georg Tanzmeister, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 585 days.

(21) Appl. No.: 17/292,042

(22) PCT Filed: Jul. 12, 2019

(86) PCT No.: PCT/DE2019/100650
§ 371 (c)(1),
(2) Date: May 7, 2021

(87) PCT Pub. No.: WO2020/094170
PCT Pub. Date: May 14, 2020

(65) Prior Publication Data
US 2021/0394761 A1 Dec. 23, 2021

(30) Foreign Application Priority Data

Nov. 8, 2018 (DE) .................. 10 2018 127 990.6

(51) Int. Cl.
*B60W 40/08* (2012.01)
*G06V 20/58* (2022.01)

(52) U.S. Cl.
CPC ............ *B60W 40/08* (2013.01); *G06V 20/58* (2022.01); *B60W 2040/0881* (2013.01); *B60W 2420/403* (2013.01); *B60W 2554/4049* (2020.02)

(58) Field of Classification Search
None
See application file for complete search history.

(56) References Cited

U.S. PATENT DOCUMENTS

2006/0164295 A1 7/2006 Focke et al.
2016/0210525 A1* 7/2016 Yang .................... G06V 40/103
(Continued)

FOREIGN PATENT DOCUMENTS

DE      102 29 334 A1    1/2004
DE   10 2015 118 874 A1   5/2017
(Continued)

OTHER PUBLICATIONS

De Silva et al., "Robust Fusion of LiDAR and Wide-Angle Camera Data for Autonomous Mobile Robots", Institute for Digital Technologies, Loughborough University, London, UK, published Aug. 20, 2018. pp. 1-21 (Year: 2018).*
(Continued)

*Primary Examiner* — Tamara L Weber
(74) *Attorney, Agent, or Firm* — Crowell & Moring LLP

(57) ABSTRACT

A controller for a vehicle is configured to determine image data from a camera of the vehicle which indicates an environment of the vehicle starting from a reference point. The controller further detects at least one camera object in the environment of the vehicle based on the image data. The controller is also configured to determine sensor data from a distance-sensing environment sensor of the vehicle. The camera object can be shifted to a plurality of different distances from the reference point. A corresponding plurality of values of a degree of overlap between the camera object and the sensor data can be determined for the plurality of different distances. The controller is also configured to
(Continued)

determine an object distance between the camera object and the reference point based on the plurality of values of the degree of overlap.

15 Claims, 3 Drawing Sheets

(56) References Cited

U.S. PATENT DOCUMENTS

| | | |
|---|---|---|
| 2017/0262716 A1 | 9/2017 | Matsumoto |
| 2017/0285161 A1* | 10/2017 | Izzat .................... G01S 17/931 |
| 2018/0217603 A1 | 8/2018 | Kwon et al. |
| 2018/0306927 A1 | 10/2018 | Slutsky et al. |
| 2019/0188541 A1* | 6/2019 | Wang .................... G01S 7/4802 |
| 2019/0383631 A1* | 12/2019 | Bigio .................... G06V 20/59 |
| 2020/0233432 A1* | 7/2020 | Mielenz ............... G05D 1/0274 |
| 2021/0131823 A1* | 5/2021 | Giorgio .............. G01C 21/3407 |
| 2021/0334556 A1* | 10/2021 | Vignard ................. G06V 20/58 |
| 2022/0214457 A1* | 7/2022 | Liang ...................... G06N 3/04 |

FOREIGN PATENT DOCUMENTS

| | | |
|---|---|---|
| DE | 10 2016 009 756 A1 | 2/2018 |
| DE | 10 2018 101 505 A1 | 8/2018 |
| DE | 10 2018 109 441 A1 | 10/2018 |
| EP | 1 788 420 A2 | 5/2007 |
| EP | 1 634 243 B1 | 2/2012 |
| EP | 3 438 777 A1 | 2/2019 |
| WO | WO 03/107067 A2 | 12/2003 |
| WO | WO 2015/144741 A1 | 10/2015 |

OTHER PUBLICATIONS

International Search Report (PCT/ISA/210) issued in PCT Application No. PCT/DE2019/100650 dated Nov. 12, 2019 with English translation (five (5) pages).

German-language Written Opinion (PCT/ISA/237) issued in PCT Application No. PCT/DE2019/100650 dated Nov. 12, 2019 (seven (7) pages).

German-language Search Report issued in German Application No. 10 2018 127 990.6 dated Jun. 14, 2019 with partial English translation (13 pages).

* cited by examiner

METHOD AND PROCESSING UNIT FOR DETERMINING INFORMATION WITH RESPECT TO AN OBJECT IN AN ENVIRONMENT OF A VEHICLE

BACKGROUND AND SUMMARY OF THE INVENTION

The present subject matter relates to a method and a corresponding processing unit which allow a vehicle, for example, to recognize and/or track a surroundings object based on sensor data from different types of sensors.

A vehicle typically comprises a plurality of different surround sensors which are set up to capture different sensor data in respect of surroundings of the vehicle. Example surround sensors include radar sensors, ultrasound sensors, lidar sensors, image sensors or image cameras, etc. One or more surrounding objects (e.g., one or more other vehicles) can be detected in surroundings of a vehicle based on the sensor data from the one or more surround sensors of the vehicle.

Different types of surround sensors typically respectively have different advantages in respect of the capture of the surroundings of a vehicle. By way of example, attributes of an object, for example the type of an object (for instance a vehicle, a pedestrian, a cyclist, a motorcyclist, etc.), the color of an object, and/or the shape of an object, can be precisely ascertained based on the image data from an image camera. Further example attributes include the state of a component (e.g., a taillight or an indicator) of an object. Moreover, different objects can usually be delimited from one another or segmented relatively well based on the image data from an image camera (e.g., objects that are arranged relatively close together). On the other hand, the distance of an object from the vehicle typically cannot be ascertained precisely based on the image data from an image camera. The sensor data from a radar and/or lidar (light detection and ranging) sensor allow the distance of an object from the vehicle to be ascertained precisely. On the other hand, only relatively few attributes of an object can typically be ascertained based on the sensor data from a radar and/or lidar sensor. The type of an object can possibly be ascertained with the sensor data from a lidar sensor. However, the state of components of an object (e.g., a taillight or an indicator) typically cannot be ascertained based on the sensor data from a radar and/or lidar sensor.

The present document considers the technical problem of providing a method and a corresponding processing unit, which facilitate reliable fusion of the sensor data from a plurality of different types of surround sensors, in particular to ascertain information in relation to surroundings objects in a precise manner.

According to one aspect, a processing unit (e.g., a controller with a microprocessor) for a vehicle, such as a motor vehicle, is described. The processing unit can be utilized to detect and track one or more surroundings objects in surroundings of the vehicle. Moreover, the processing unit can be utilized to guide the vehicle, at least partly in automated fashion, based on the one or more detected surroundings objects.

The vehicle can comprise one or more cameras which are set up to capture image data in relation to the surroundings of the vehicle. The image data can comprise a temporal sequence of images (for a corresponding sequence of times). Moreover, the vehicle can comprise one or more distance-sensing surround sensors (such as, e.g., a radar sensor and/or lidar sensor), which are set up to capture sensor data in relation to the surroundings of the vehicle. In the process, the sensor data can indicate a multiplicity of detected points (each with a distance value in respect of the distance of the respective point from the surround sensor) for a certain time.

The processing unit is set up to ascertain image data from at least one camera of the vehicle, wherein the image data indicate surroundings of the vehicle proceeding from a reference point (e.g., proceeding from the camera). Moreover, the processing unit is set up (e.g., using one or more image processing algorithms) to detect at least one camera object in the surroundings of the vehicle based on the image data. By way of example, the contours of an object can be detected based on the image data. Moreover, the type of an object (e.g., vehicle, pedestrian, cyclist, etc.) can possibly be ascertained based on the image data. On the other hand, the distance of the camera object from the reference point can usually be determined only relatively imprecisely based on the image data.

The processing unit is further set up to ascertain sensor data from at least one distance-sensing surround sensor of the vehicle, wherein the sensor data indicate a multiplicity of detected points in the surroundings of the vehicle. Moreover, the sensor data can indicate a distance of the point for each detected point, in particular a distance relative to the reference point. The sensor data of the distance-sensing surround sensor and the image data could be synchronized in time (e.g., captured at the same time).

Typically, the camera and the surround sensor are arranged at different locations on the vehicle. As a consequence thereof, the image data from the camera and the sensor data from the surround sensor can be provided in different coordinate systems in each case. In this case, the coordinate systems of the camera and of the surround sensor are typically convertible into one another by way of a transformation (e.g., a rotation and/or a translation) that is known in advance.

The processing unit can be set up to represent the camera object and the sensor data from the surround sensor in a common coordinate system (such that both the camera object and the sensor data can be related to a common reference point). In particular, this can be implemented by a projection of the camera object into the coordinate system of the surround sensor or by projection of the sensor data into the coordinate system of the camera (by means of the transformation that is known in advance). This can facilitate precise processing of the image data and the sensor data for the purposes of recognizing surroundings objects.

The processing unit can be further set up to displace the camera object to a multiplicity of different distances from the reference point or to (successively) place the camera object at a plurality of different distances from the reference point. In the process, the camera object can be displaced, in particular, along a ray emanating from the reference point in order to alter the radial distance from the reference point. Moreover, the camera object can be scaled (i.e., enlarged or reduced) based on the respective distance from the reference point. In particular, the camera object can be reduced when the camera object is displaced toward the reference point. On the other hand, the camera object can be enlarged if the camera object is displaced away from the reference point. Consequently, it is possible to consider different hypotheses in relation to the distance of the camera object from the reference point.

The processing unit can be configured to ascertain an estimated distance of the camera object from the reference point (possibly only) based on the image data. Then, the camera object can be displaced around the estimated distance within a certain distance range to displace the camera object to the multiplicity of different distances. The distance range can define, for example proceeding from the estimated distance, a displacement toward the reference point and/or away from the reference point by 20%, 30% or more of the estimated distance. Then, different distances (e.g., 20, 30, 50, 100 or more different (possibly equidistant) distances) can be selected within the distance range.

Moreover, the processing unit is set up to ascertain for the multiplicity of different distances a corresponding multiplicity of values of an amount of overlap of the respective (displaced and/or scaled) camera object with detected points of the sensor data. In this case, the amount of overlap can indicate how strongly the (respectively displaced and/or scaled) camera object overlaps with detected points of the sensor data from the distance-sensing surround sensor. In this case, a relatively strong overlap indicates that the detected points of the sensor data from the distance-sensing surround sensor indicate a surroundings object (at the distance from the reference point indicated by the detected points) which corresponds to the camera object. On the other hand, a relatively low overlap indicates that there presumably is no surroundings object at the distance at which the camera object has been placed.

Moreover, the processing unit can be set up to ascertain an object distance of the camera object from the reference point based on the multiplicity of values of the amount of overlap. In particular, the distance from the multiplicity of different distances can be selected in the process as the object distance for which the ascertained value of the amount of overlap indicates a particularly large overlap between the camera object and the detected points from the sensor data. In particular, it is possible to select the distance corresponding to the maximum or minimum value of the amount of overlap as the object distance. The ascertained object distance can then be considered when ascertaining information in relation to the surroundings objects in the surroundings of the vehicle. This can efficiently increase the detection quality of surroundings objects.

As an alternative or in addition to the ascertainment of an object distance, the camera object can be assigned to, or associated with, a subset of the detected points of the sensor data based on the multiplicity of values of the amount of overlap. Object-relevant information from the image data can then be considered in a precise fashion when recognizing surroundings objects based on the sensor data from the distance-sensing surround sensor. This can efficiently increase the detection quality of surroundings objects.

By altering the distance of a camera object during the superposition of image data from an image camera and sensor data from a distance-sensing surround sensor, it is possible to reliably compensate faulty calibrations between the image camera and the distance-sensing surround sensor and/or errors in the temporal synchronization between image data and sensor data.

The processing unit can be configured to ascertain an angle range, in particular an azimuth angle range and/or height angle range, around the reference point for the camera object. In the process, the angle range can be ascertained in such a way that rays which delimit the angle range and emanate from the reference point (exactly) enclose the camera object at two different sides, optionally with an additional tolerance buffer at the two different sides of the camera object. Consequently, it is possible to enclose the portion of the surroundings of the vehicle in which a search is carried out for detected points that could correspond to the camera object. In particular, the displacement of the camera object can be implemented (exclusively) within the portion of the surroundings of the vehicle that is defined by the one or two angle ranges (i.e., the azimuth angle range and/or the height angle range). In the process, the camera object can be displaced and scaled in such a way that (proceeding from the estimated distance of the camera object) the camera object always remains within the rays delimiting the angle range or angle ranges.

The camera object can consequently be displaced within the portion of the surroundings of the vehicle defined by the angle range or by the angle ranges along a ray emanating from the reference point. A value of the amount of overlap of the respective (displaced and/or scaled) camera object can then be ascertained (in particular, exclusively) with detected points of the sensor data from the portion of the surroundings of the vehicle defined by the angle range or by the angle ranges. This can increase the accuracy and the efficiency of the ascertainment of the object distance and/or the assignment of a camera object to the detected points of a distance-sensing surround sensor.

The azimuth angle range can be ascertained, e.g., in the horizontal direction based on the image data and/or based on the sensor data. Correspondingly, the height angle range can be ascertained in the vertical direction based on the image data and/or based on the sensor data. By taking account of the azimuth angle range and the height angle range in combination, it is possible to further increase the accuracy of the ascertained object distance and/or the assignment of the camera object to the detected points of a distance-sensing surround sensor.

The camera object can indicate a multiplicity of camera points in the surroundings of the vehicle, at which the camera object is arranged. By way of example, the camera points can be described by a polygonal chain (in particular, by a cuboid). The displacement of the camera object can then comprise the displacement of at least a few of the multiplicity of camera points (in particular, along a ray emanating from the reference point). Furthermore, points can be supplemented or discarded within the scope of the displacement (to enlarge or reduce the camera object). By considering individual camera points to describe a camera object, it is possible to increase the accuracy of the ascertainment of an overlap between a camera object and a subset of detected points of the sensor data.

In particular, the ascertainment of a value of the amount of overlap when taking account of individual camera points for describing a camera object can comprise the ascertainment of a proportion of the multiplicity of camera points of the camera object which coincide with detected points of the sensor data. As an alternative or in addition thereto, the ascertainment of a value of the amount of overlap can comprise the ascertainment of the distance (e.g., a mean distance) of the multiplicity of camera points of the camera object from detected points of the sensor data. As an alternative or in addition thereto, the ascertainment of a value of the amount of overlap can comprise the ascertainment of a degree of overlap of the multiplicity of camera points of the camera object with detected points of the sensor data. Thus, the overlap between a camera point and detected points of the sensor data can be ascertained in a precise manner.

The processing unit can be set up to assign the camera object to a subset of the multiplicity of detected points based on the ascertained object distance. Furthermore, the processing unit can be set up to ascertain an occupancy grid of the surroundings of the vehicle based on the sensor data and taking account of the assigned camera object. Here, the occupancy grid can respectively indicate for a multiplicity of cells in the surroundings of the vehicle the probability of whether the respective cell is free (and so the vehicle might be able to drive therethrough) or whether the respective cell is occupied by an object (and consequently could lead to a collision with the vehicle). As a result of the provision of an occupancy grid, surroundings objects can be detected and tracked in precise fashion (based on a sequence of successive times). Consequently, the at least partly automated driving of a vehicle can be further improved.

The processing unit can consequently be set up to ascertain an occupancy grid of the surroundings of the vehicle based on the sensor data. Moreover, the processing unit can be set up to detect a surroundings object, which corresponds to the camera object, in the surroundings of the vehicle based on the occupancy grid, taking account of the camera object at the ascertained object distance from the reference point. Then, one or more attributes of the surroundings object, in particular an object type from a plurality of different object types, can reliably be ascertained based on the image data. The fusion described in this document between image data and sensor data for a distance-sensing surround sensor consequently facilitates the reliable ascertainment of in-depth information about surroundings objects.

The processing unit can be set up to determine, based on the multiplicity of values of the amount of overlap, whether or not the camera object can be assigned to a subset of the multiplicity of detected points. To this end, the values of the amount of overlap can be compared to an overlap threshold, the overlap threshold indicating a minimum value or a maximum value of the amount of overlap which must be present as a minimum or as a maximum in order to be able to assume that the camera object corresponds to an object that is recognizable in the sensor data from the distance-sensing surround sensor. The overlap threshold can be ascertained in advance (e.g., by experiment). As an alternative or in addition thereto, the overlap threshold can be ascertained in automated fashion, i.e., learned, by means of machine learning.

The processing unit is further configured to leave the camera object unconsidered when ascertaining the occupancy grid of the surroundings of the vehicle if it was determined that the camera object cannot be assigned to any subset of the multiplicity of detected points. On the other hand, the processing unit can be configured to take account of the camera object when ascertaining the occupancy grid of the surroundings of the vehicle based on the sensor data in accordance with the ascertained object distance, if it was determined (in particular only in this case) that the camera object can be assigned to a subset of the multiplicity of detected points. This can further increase the robustness and the reliability of the object recognition.

The multiplicity of detected points of the sensor data can comprise at least one possible non-obstacle point, in particular a possible ground point. In particular, a detected point of the distance-sensing surround sensor can be classified as an obstacle point if it (probably) belongs to a surroundings object, which represents an obstacle, arranged in the surroundings of the vehicle. On the other hand, a detected point of the distance-sensing surround sensor can be classified as a non-obstacle point if it (probably) does not belong to a surroundings object but can be traced back to noise, to the ground, or to an object under which it is possible to drive (e.g., a tunnel or a bridge).

The possible non-obstacle point, in particular the ground point, can be detected based on height information in the sensor data from the distance-sensing surround sensor, for example. Even though the possible non-obstacle point possibly does not correspond to any surroundings object in the surroundings of the vehicle, the values of the amount of overlap might possibly nevertheless be ascertained by taking account of the possible non-obstacle point. This can further increase the recognition quality of surroundings objects (since possible non-obstacle points are not excluded from the start).

On the other hand, the possible non-obstacle point can remain unconsidered when ascertaining the occupancy grid if no camera object was assigned to the non-obstacle point. Furthermore, the possible non-obstacle point can be considered when ascertaining the occupancy grid (in particular, only in this case) if a camera object was assigned to the non-obstacle point. This can further increase the reliability of the recognition of surroundings objects.

As already presented above, the processing unit can be set up to operate at least one vehicle function of the vehicle, in particular at least partly automated driving of the vehicle, based on the ascertained object distance and/or based on an occupancy grid of the surroundings of the vehicle that depends on the ascertained object distance. This allows reliable vehicle functions to be provided efficiently.

According to a further aspect, a method is described for ascertaining information in relation to an object in surroundings of a vehicle. The method comprises the ascertainment of image data of a camera of the vehicle, wherein the image data indicate surroundings of the vehicle proceeding from a reference point. Moreover, the method comprises the detection of at least one camera object in the surroundings of the vehicle based on the image data. Further, the method comprises the ascertainment of sensor data from a distance-sensing surround sensor of the vehicle. Moreover, the method comprises the displacement of the camera object to a multiplicity of different distances relative to the reference point, and the ascertainment of a multiplicity of values of an amount of overlap of the respective camera object with the sensor data for the multiplicity of different distances. It is possible to ascertain an object distance of the camera object from the reference point based on the multiplicity of values of the amount of overlap.

According to a further aspect, a (road) motor vehicle (in particular, an automobile or a truck or a bus) is described, which comprises the processing unit described in this document.

According to a further aspect, a software (SW) program is described. The SW program can be set up to be executed on a processor (e.g., on a controller of a vehicle) and to thus carry out the method described in this document.

According to a further aspect, a non-transitory storage medium is described. The non-transitory storage medium can comprise an SW program which is configured to be executed on a processor and to thus carry out the method described in this document.

It should be noted that the methods, devices, and systems described in this document can be used both on their own and in combination with other methods, devices, and systems described in this document. Moreover, all aspects of the methods, devices and systems described in this document can be combined with one another in many different ways. The features of the claims can be combined with one another in many different ways.

DETAILED DESCRIPTION OF THE DRAWINGS

Figure 1:
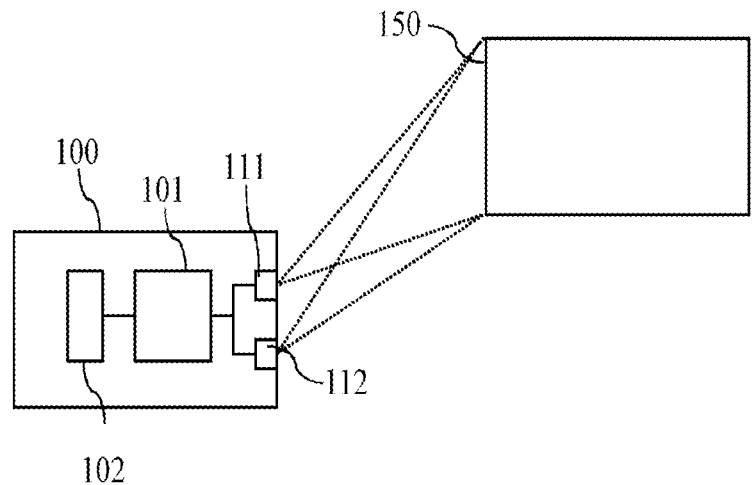
FIG. 1 shows an example vehicle having a multiplicity of different surround sensors.

As explained at the outset, the present document considers the detection and tracking of at least one surroundings object based on sensor data from a plurality of surround sensors. In this context, FIG. 1 shows a vehicle 100 having one or more surround sensors 111, 112 for capturing sensor data. The vehicle 100 further comprises a processing unit 101 which is set up to detect an object 150 in the surroundings of the vehicle 100 the basis of the sensor data. A detected object 150 can then be used in a vehicle function 102 (e.g., for partly automated or highly automated driving of the vehicle 100).

Figure 2:
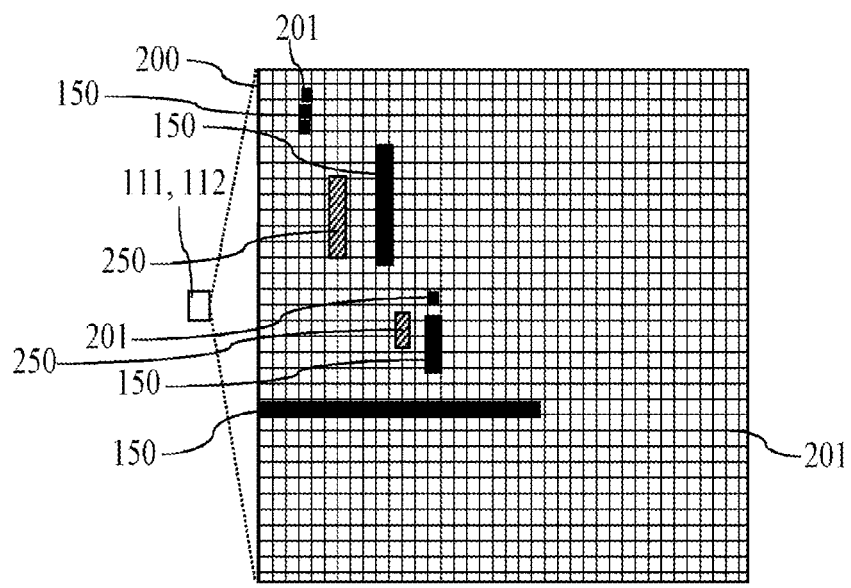
FIG. 2 shows an example grid of surroundings of a vehicle.

The present document considers consistent multi-sensor modeling of the surroundings of a vehicle 100. In this case, the local surroundings can be estimated or represented as an occupancy grid map or grid 200 (see FIG. 2). FIG. 2 shows an example grid 200 of surroundings of the vehicle 100 with a multiplicity of grid cells or cells 201 for short. The grid 200 can divide the environment or the surroundings of the vehicle 100 into the multiplicity of two-dimensional (2D) or three-dimensional (3D) cells 201. In this case, a two-dimensional cell 201 can have a rectangular shape (e.g., with an edge length of 10 cm, 5 cm, 2 cm, 1 cm or less).

The processing unit 101 of the vehicle 100 can be set up to ascertain measurement data for one or more of the cells 201 (in particular, for each cell 201) based on the sensor data, the measurement data indicating whether or not a cell 201 is occupied at a certain time t. In particular, the measurement data $z_c$ for a cell c 201 can indicate $$z_c = (m(SD_{Z,t}), m(F_{Z,t})),$$

where m({SD}) is evidence or a mass of evidence that the cell c 201 is occupied by an object 150 (e.g., a static or dynamic object), and where m(F) is evidence that the cell c 201 is free, and hence not occupied by an object 150. The evidence that the cell 201 is occupied by an object 150 can be considered an object probability that the cell 201 is occupied by an object 150 (in particular, in the sense of Dempster-Shafer theory).

Typically, a measurement, isolated in time, at a certain time t only allows the evidence or masses of evidence m(SD), m(F) to be ascertained since it is not possible to determine whether the object is occupied by a static or dynamic object 150. However, it can be assumed that, following a sequence of measurements (by the sensors 111, 112) at a corresponding sequence of times, it is possible to provide an occupancy grid $\mathcal{M}_t$ 200 at the current time t, which occupancy grid indicates different evidence for different hypotheses for the different cells 201:

$$\mathcal{M}_t = \{m(S_t), m(D_t), m(SD_t), m(F_t), m(FD_t)\},$$

where $m(FD_t)$ indicates the evidence for the hypothesis that a cell 201 that was unoccupied in the past could be occupied by a dynamic object 150 at the time t. Further, $m(S_t)$ indicates the evidence or mass of evidence that the cell c 201 is occupied by a static object 150 at the time t. Moreover, $m(D_t)$ indicates the evidence or mass of evidence that the cell c 201 is occupied by a dynamic object 150 at the time t. The occupancy grid $\mathcal{M}_t$ 200 describes the status or the state of the cells 201 of the grid 200 at a certain time t.

By way of example, the occupancy grid 200 can be ascertained based on the sensor data from one or more surround sensors 111, which each have a relatively high accuracy in respect of the distance of an object 150 from the respective surround sensor 111. Consequently, the distance of the occupied cells 201 of the occupancy grid 200 from the respective surround sensor 111 can be a reference distance for an object to be detected. Example surround sensors 111 with a relatively precise ascertainment of the distance include lidar sensors and/or radar sensors.

Moreover, the sensor data of at least one image camera 112 can be used to detect a surroundings object. In this document, the sensor data from an image camera 112 are also referred to as image data. The processing unit 101 can be set up to detect one or more objects 250 based on the image data. In this case, an object 250 detected based on image data is referred to as camera object in this document.

Consequently, a first occupancy grid 200 can be ascertained based on the sensor data from a distance-sensing surround sensor 111 and a second occupancy grid 200 can be ascertained based on image data, it being possible to superpose the occupancy grids in order to ascertain a common or fused occupancy grid 200. Because the distance of a camera object 250 can typically be determined only relatively inaccurately based on the image data, the superposition of the two occupancy grids 200 may lead to objects being recognized twice (at different distances) or possibly not being recognized at all. The superposition of occupancy grids 200 from the sensor data of different types of surround sensors 111, 112 can consequently lead to a relatively low recognition quality of surroundings objects.

Figure 3:
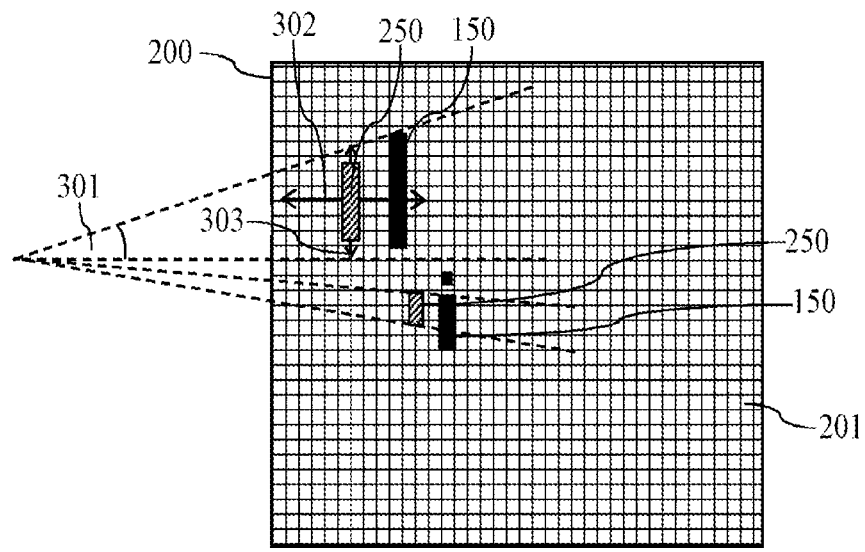
FIG. 3 shows an example superposition of a camera object with a lidar-based occupancy grid.

This problem can be avoided by virtue of, in the run-up to data fusion, there being an assignment of the one or more detected camera objects 250 to cells 201 of an occupancy grid 200 that was ascertained based on the sensor data from a distance-sensing surround sensor 111 (e.g., based on a lidar or radar sensor data). FIG. 3 shows an example camera object 250, which was converted or transformed into an occupancy grid 200 that was ascertained based on sensor data from a distance-sensing surround sensor 111. Typically, the camera 112 for capturing the image data and the surround sensor 111 for capturing the sensor data are arranged at different positions on a vehicle 100. The different positions of the camera 112 and of the surround sensor 111 are known, and consequently it is possible to ascertain a transformation (e.g., with six degrees of freedom, three degrees of freedom for translation and three degrees of freedom for rotation) in the run-up, the transformation allowing a detected camera object 250 to be transformed from the coordinate system of the camera 112 into the coordinate system of the distance-sensing surround sensor 111.

A detected camera object 250 extends over a certain azimuth angle range 301 (relative to a certain reference point 305). By way of example, the reference point 305 can correspond to the position of a sensor 111, 112 (e.g., of the camera 112 and/or of the distance-sensing surround sensor 111) in the coordinate system underlying the occupancy grid 200. Here, the angle range 301 can correspond to the angular section of the capture range of the camera 112 in which the camera object 250 is located. If necessary, the angle range 301 can be extended by a certain tolerance buffer 303 on both sides of the camera object 250.

The distance of the camera object 250 from the reference point 305 can be altered within the ascertained angle range 301 (illustrated by the double-headed arrow 302). In the process, the camera object 250 can be scaled in such a way that the camera object 250 extends over the entire angle range 301 at every distance (possibly taking account of tolerance buffers 303 on both sides).

For each distance, the value of an amount of overlap can be ascertained for the overlap of the (scaled) camera object 250 with the cells or points 201 of the occupancy grid 200. The (scaled and displaced) camera object 250 can indicate, for example for each cell 201 of the occupancy grid 200, a mass of evidence that the cell 201 is a part of the camera object 250. Moreover, the occupancy grid 200 indicates for each cell 201 the aforementioned masses of evidence that the cell 201 is occupied. To ascertain a value of the amount of overlap, it is possible

- to ascertain for the cells 201 covered by the angle range 201 the respective product of the mass of evidence that the cell 201 is part of the (scaled and displaced) camera object 250 and the mass of evidence that the cell 201 is occupied; and
- to ascertain the mean absolute or quadratic sum of the products.

It is consequently possible to respectively ascertain a value of an amount of overlap for a multiplicity of different distances of the camera object 250. Moreover, it is possible to ascertain based on the values of the amount of overlap the object distance of the camera object 250 at which there is a particularly good overlap, in particular an optimal overlap, between the (scaled and displaced) camera object 250 and the occupancy grid 200. This scaled and displaced camera object 250 can then be fused with the cells 201 of the occupancy grid 200 and can be considered when recognizing surroundings objects. This can increase the recognition quality of surroundings objects.

As an alternative or in addition thereto, it is possible (instead of deriving respective individual grids 200 from the sensor data from different sensors 111, 112 in a first step and then fusing these in cell-based fashion) to directly fuse one or more detected camera objects 250 with the sensor data of a distance-sensing surround sensor 111 (e.g., a laser scanner). Only following this is it then possible to derive a scanning grid 200 based on the already fused information where necessary.

The fusion of or association between the camera object 250 and the sensor data from a distance-sensing surround sensor 100 can be implemented as follows:

- A camera object 250 is typically described relative to a coordinate system of the camera 112, with which the image data for detecting the camera object 250 were captured. The sensor data of a distance-sensing surround sensor 111 (e.g., a lidar sensor) can then be projected or transformed into the 3D coordinate system of the camera 112 by a transformation (translation and/or rotation). Alternatively, as described above, there can be a transformation of the camera object 250 into the coordinate system of the distance-sensing surround sensor 111.
- It is then possible to ascertain the azimuth angle range 301 which is spanned by the camera object 250 (possibly with an added tolerance delta or tolerance buffer 303, in each case to the left and right of the camera object 250).
- Moreover, it is possible to extract the sensor data lying within this azimuth angle range 301 from the distance-sensing surround sensor 111.
- The camera object 250 can be placed to different distance values and scaled accordingly. The value of a quality function (i.e., the value of an amount of overlap) can be calculated for each distance value, the quality function indicating how well the (scaled and displaced) camera object 250 matches the sensor data from the distance-sensing surround sensor 111.
- The camera object 250 can then be associated with the occupied cells 201 for which there is a relatively good fit (i.e., a relatively good value of the quality function), which cells were recognized based on the sensor data from the distance-sensing surround sensor 111.

As soon as one or more camera objects 250 were associated with points or cells 201 of an occupancy grid 200 ascertained based on the sensor data from the distance-sensing surround sensor 111, it is possible to derive a fused occupancy grid 200, which contains both the information from the distance-sensing surround sensor 111 and the information from the camera 112.

Figure 5:
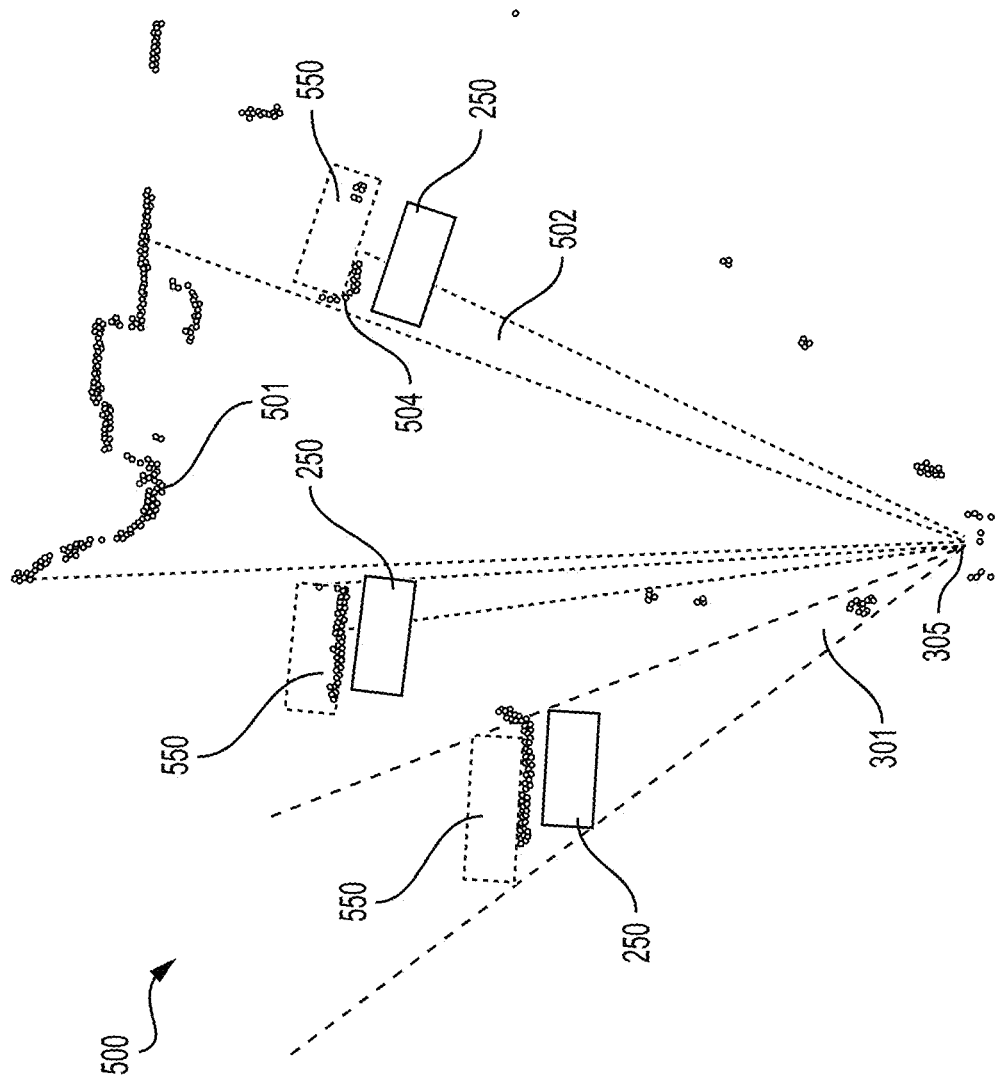
FIG. 5 shows an example superposition of a camera object with the sensor data from a distance-sensing surround sensor.

As illustrated in FIG. 5, the sensor data 500 from a distance-sensing surround sensor 111 can indicate a multiplicity of detected points 501, 504. Here, a point 501, 504 can be a location in a capture range of the surround sensor 111, at which a reflection of a sensor signal (e.g., a laser signal or radar signal) emitted by the surround sensor 111 has occurred. Consequently, an object can be arranged at a point 501, 504 detected by the surround sensor 111. Moreover, the sensor data of a distance-sensing surround sensor 111 indicate regions 502 which are free with a high probability (since no object is arranged in these regions 502 between the sensor origin and the first detection of an obstacle).

Moreover, FIG. 5 shows example camera objects 250, which can be associated with detected points 501, 504 of the sensor data 500 by altering the distance relative to the reference point 305 within a respective angle range 301 and by appropriate scaling. Then, surroundings objects 550 can be detected based on the association of the detected points 501, 504 of the sensor data 500 from the distance-sensing surround sensor 111 with the one or more camera objects 250. In this case, the spatial position of the one or more surroundings objects 550 can be ascertained in a precise manner based on the sensor data 500 from the distance-sensing surround sensor 111. Moreover, there can be a precise classification of the surroundings objects 550 (e.g., into different object types, for instance a vehicle, pedestrian, cyclist, etc.) based on the image data. Moreover, further attributes of a surroundings object 550 (such as, e.g., the color, the shape, etc.) can be ascertained in a precise manner based on the image data. Moreover, reliable clustering of detected points 501, 504 of the sensor data 500 from the distance-sensing surround sensor 111 to one or more different surroundings objects 550 can be implemented based on the image data.

Based on the fused sensor data illustrated in FIG. 5, it is possible to ascertain a fused occupancy grid 200 in a precise manner, the fused occupancy grid also indicating an object association of cells 201 to one or more different surroundings objects 550 in addition to the occupancy probability of the individual cells 201.

A point 501, 504 detected based on the distance-sensing surround sensor 111 may have been caused by a reflection at an object 550 or by a reflection from the ground. Consequently, a detected point 501, 504 can be a possible ground point, which should not be assigned to any object 550. The distinction between an object point 501 and a possible ground point 504 can be ascertained, for example, based on the height at which a reflection took place. If a reflection only occurred at a relatively low height above the ground, it may be possible to deduce that the detected point 501, 504 is a possible ground point 504.

In principle, the detected points 501, 504 from a distance-sensing surround sensor 111 can be classified in different classes, e.g., rain, noise, ground, able to drive underneath (such as, e.g., a tunnel or a bridge), etc. In turn, these classes can be subsumed relatively coarsely into the classes of "obstacle" and "no obstacle". The re-validation of one of the points from the "no obstacle" class, described in this document, can be implemented for all points of the "no obstacle" class (and not only for the ground points 504). Therefore, a ground point can generally be a non-obstacle point.

A height-based classification into object points 501 and ground points 504 is typically afflicted by errors. The association of a camera object 250 with detected points 501, 504 in sensor data 500 from a distance-sensing surround sensor 111, described in this document, allows all detected points 501, 504, in particular also points identified as possible ground points 504, to be initially taken into account in the data fusion. If a possible ground point 504 is associated with a camera object 250, it is possible to deduce therefrom that the point is not a ground point but an object point. On the other hand, a possible ground point 504 can be assigned to the ground with greater probability if the possible ground point is not associated with any camera object 250. Consequently, the quality of the recognition of surroundings objects 550 can be further increased.

Figure 4:
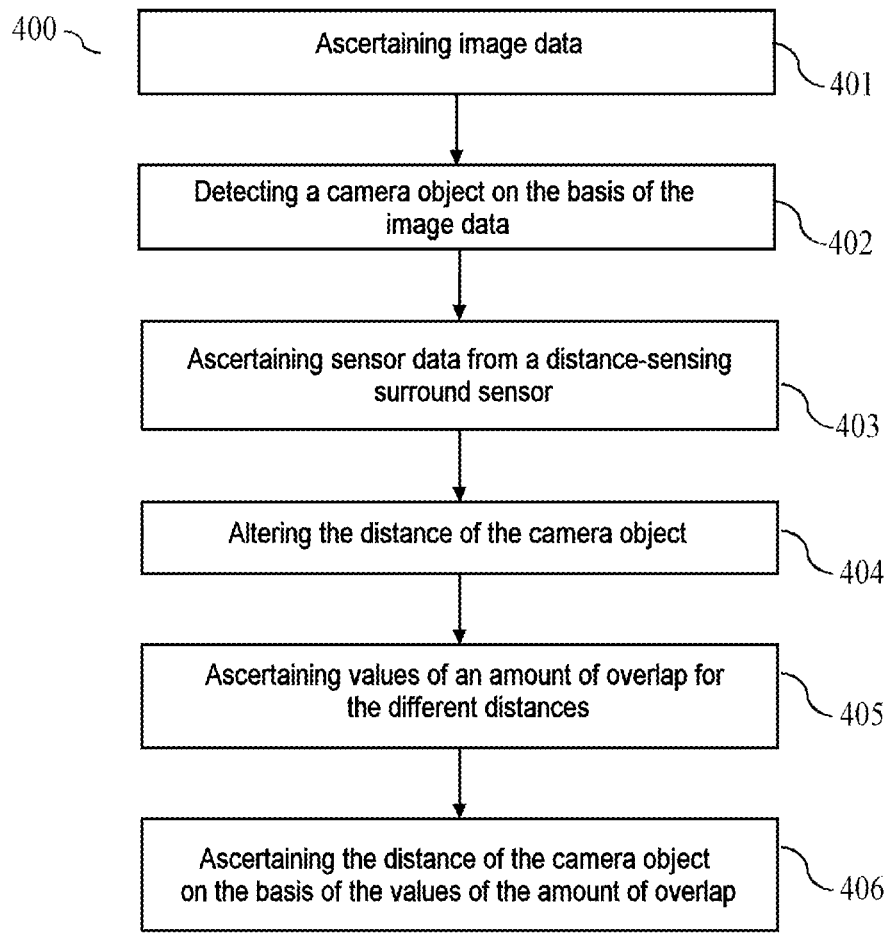
FIG. 4 shows a flowchart of an example method for ascertaining information in relation to a surroundings object.

FIG. 4 shows a flowchart of an example method 400 for ascertaining information in relation to a surroundings object in surroundings of a vehicle 100. In particular, the method 400 can contribute to fusing sensor data from different sensors 111, 112 in order to increase the detection quality of objects and/or in order to ascertain additional information in relation to detected objects. Moreover, the method 400 can be used to guide a vehicle 100, at least in partly automated fashion, based on the information ascertained in relation to an object. The method 400 can be carried out by a processing unit 101 of a vehicle 100.

The method 400 comprises ascertaining 401 image data of a camera 112 (in particular a mono camera) of the vehicle 100. Here, the image data can indicate surroundings of the vehicle 100 proceeding from a reference point 305. By way of example, the reference point 305 can correspond to the sensor area of the camera 112.

Moreover, the method 400 comprises detecting 402 at least one camera object 250 in the surroundings of the vehicle 100 based on the image data. To this end, it is possible to use one or more image analysis algorithms, which are set up, for example, to recognize the contours of at least one object based on the image data (e.g., based on the image pixels of the image frame), wherein an object detected based on the image data is referred to as a camera object 250 in this document.

The image data allow the contours and/or the shape of surroundings objects 550 to be ascertained in a precise manner. Moreover, using classification algorithms, the object type of the surroundings object 550 can typically be ascertained in a precise manner based on the image data. On the other hand, the distance of a surroundings object 550 from the reference point 305 can usually be ascertained only with relatively low accuracy based on the image data.

The method 400 further comprises ascertaining 403 sensor data 500 from a distance-sensing surround sensor 111 of the vehicle 100. In this case, the ascertainment 403 of sensor data 500 from a distance-sensing surround sensor 111 can be implemented in parallel with the ascertainment 401 of image data and the detection 402 of at least one camera object 250. In particular, the sensor data 500 and the image data can relate to the same (scanning) time.

A distance-sensing surround sensor 111 can be a sensor with which the distance from measurement points is ascertained in a precise manner. Example distance-sensing surround sensors 111 include a radar sensor or a lidar sensor. The sensor data 500 from the distance-sensing surround sensor 111 can indicate a multiplicity of detected points 501, 504 in the surroundings of the vehicle 100. Here, the detected points 501, 504 can be reflection points, at which a sensor signal emitted by the surround sensor 111 was reflected.

Moreover, the method 400 comprises displacing 404 the camera object 250 to a multiplicity of different distances relative to the reference point 305. In this case, the camera object 250 can be displaced along a ray emanating from the reference point 305 in order to position the camera object 250 at different (radial) distances from the reference point 305. The camera object 250 can also be scaled within the scope of the displacement 404 of the camera object 250. In the process, the camera object 250 can be reduced in size if the camera object 250 is displaced closer to the reference point 305 and/or enlarged if the camera object 250 is displaced further away from the reference point 305.

Moreover, the method 400 comprises ascertaining 405 a multiplicity of values of an amount of overlap for the overlap of the respective (displaced and/or scaled) camera object 250 with detected points 501, 504 of the sensor data 500 for the multiplicity of different distances.

Further, the method 400 comprises ascertaining 406 an object distance of the camera object 250 from the reference point 305 based on the multiplicity of values of the amount of overlap. Here, the object distance can be chosen as the distance from the multiplicity of different distances where the amount of overlap indicates a comparatively optimal overlap of the camera object 250 with detected points 501, 504 of the sensor data 500. In particular, the object distance can be chosen as the distance from the multiplicity of different distances for which the value of the amount of overlap is maximal or minimal.

Moreover, the camera object 250 can be assigned (based on the ascertained object distance) to a subset of the multiplicity of detected points 501, 504. This assignment can then be considered when ascertaining an occupancy grid 200. Here, the occupancy grid 200 can indicate for a multiplicity of cells 201 a respective probability of the respective cell 201 being occupied by a surroundings object 550. The occupancy grid 200 can be used to reliably detect and/or track one or more surroundings objects 550. The vehicle 100 can then be guided, at least in partly automated fashion, depending on the one or more surroundings objects 550. Consequently, it is possible to increase the reliability and the safety of a vehicle 100 driven in at least partly automated fashion.

The method 400 can be repeated regularly, in particular periodically (e.g., with a frequency of 10 Hz, 20 Hz, 25 Hz or more). In the process, respective current image data and/or sensor data 500 can be ascertained and considered at the respective times. As a result of repeating the method 400, it is possible to reliably detect and track surroundings objects 500 while a vehicle 100 is in motion.

The present subject matter is not restricted to the example embodiments shown. In particular, it should be noted that the description and the figures are only intended to elucidate the principle of the proposed methods, devices, and systems.

What is claimed is:

1. A controller for a vehicle, comprising:
a microprocessor;
a memory in communication with the microprocessor, the memory storing a plurality of instructions executable by the microprocessor to cause the controller to:
ascertain image data from a camera of the vehicle, wherein
the image data indicate surroundings of the vehicle proceeding from a reference point;
detect at least one camera object in the surroundings of the vehicle based on the image data;
ascertain sensor data from a distance-sensing surround sensor of the vehicle, wherein the sensor data indicate a multiplicity of detected points in the surroundings of the vehicle;
superposition the image data and the sensor data, wherein, during superpositioning, the camera object is displaced to a multiplicity of different distances from the reference point and scaled at each of the different distances;
ascertain for the multiplicity of different distances a corresponding multiplicity of values of an amount of overlap of the respective camera object with detected points of the sensor data; and
ascertain an object distance of the camera object from the reference point based the multiplicity of values of the amount of overlap;
ascertain an azimuth angle range and/or height angle range, around the reference point for the camera object;
wherein displacement of the camera object is peerformed within a portion of the surroundings of the vehicle defined by the angle range along a ray emanating from the reference point; and
ascertain a value of the amount of overlap of the respective camera object exclusively with detected points of the sensor data from the portion of the surroundings of the vehicle;
wherein scaling is performed during the superpositioning at each of the different distances such that the camera object always remains within the rays delimiting the angle range.

2. The controller according to claim 1, wherein
the angle range is ascertained such that rays delimiting the angle range and emanating from the reference point enclose the camera object at two different sides of the camera object.

3. The controller according to claim 2, wherein
the azimuth angle range is ascertained by incorporating a tolerance buffer at the two different sides of the camera object.

4. The controller according to claim 1, wherein the memory further includes instructions executable by the microprocessor to cause the controller to:
ascertain an azimuth angle range and a height angle range around the reference point for the camera object;
wherein displacement of the camera object is performed within a portion of the surroundings of the vehicle, which is defined by the azimuth angle range and the height angle range, along a ray emanating from the reference point; and
ascertain a value of the amount of overlap of the respective camera object exclusively with detected points of the sensor data from the portion of the surroundings of the vehicle.

5. The controller according to claim 1, wherein the memory further includes instructions executable by the microprocessor to cause the controller to:
ascertain an estimated distance of the camera object from the reference point based on the image data; and
wherein displacement of the camera object is performed within a distance range around the estimated distance along a ray emanating from the reference point.

6. The controller according to claim 1, wherein
the camera and the surround sensor are arranged at different locations on the vehicle;
the controller is configured to represent the camera object and the sensor data of the surround sensor in a common coordinate system, by:
a projection of the camera object into a coordinate system of the surround sensor; or
a projection of the sensor data into a coordinate system of the camera.

7. The controller according to claim 1, wherein
the camera object indicates a multiplicity of camera points in the surroundings of the vehicle at which the camera object is arranged; and
the displacement of the camera object is performed along a ray emanating from the reference point of at least some of the multiplicity of camera points.

8. The controller according to claim 7, wherein the ascertainment of a value of the amount of overlap comprises at least one of:
ascertaining a proportion of the multiplicity of camera points of the camera object which coincide with detected points of the sensor data;
ascertaining a distance of the multiplicity of camera points of the camera object from detected points of the sensor data; or
ascertaining a degree of overlap of the multiplicity of camera points of the camera object with detected points of the sensor data.

9. The controller according to claim 1, wherein
the multiplicity of detected points comprises at least one possible non-obstacle point which does not indicate a surroundings object arranged in the surroundings of the vehicle; and
the values of the amount of overlap are ascertained by taking account of the possible non-obstacle point.

10. The controller according to claim 1, wherein the memory further includes instructions executable by the microprocessor to cause the controller to:
assign the camera object to a subset of the multiplicity of detected points based on the ascertained object distance; and
ascertain an occupancy grid of the surroundings of the vehicle based on the sensor data and the assigned camera object, the occupancy grid respectively indicating for a multiplicity of cells of the surroundings of the vehicle the probability of whether the respective cell is free or whether the respective cell is occupied by an object.

11. The controller according to claim 10, wherein
the possible non-obstacle point remains unconsidered when ascertaining the occupancy grid if no camera object was assigned to the non-obstacle point; and/or
only the possible non-obstacle point is considered when ascertaining the occupancy grid if a camera object was assigned to the non-obstacle point.

12. The controller according to claim 1, wherein the memory further includes instructions executable by the microprocessor to cause the controller to:

determine based on the multiplicity of values of the amount of overlap whether or not the camera object can be assigned to a subset of the multiplicity of detected points; and leave the camera object unconsidered when ascertaining an occupancy grid of the surroundings of the vehicle based on the sensor data if it was determined that the camera object cannot be assigned to any subset of the multiplicity of detected points; and/or consider the camera object in accordance with the ascertained object distance when ascertaining the occupancy grid of the surroundings of the vehicle based on the sensor data only if it was determined that the camera object can be assigned to a subset of the multiplicity of detected points.

13. The controller according to claim 1, wherein the memory further includes instructions executable by the microprocessor to cause the controller to:

ascertain an occupancy grid of the surroundings of the vehicle based on the sensor data;

detect a surroundings object, which corresponds to the camera object, in the surroundings of the vehicle based on the occupancy grid, taking account of the camera object at the ascertained object distance from the reference point; and ascertain one or more attributes of the surroundings object based on the image data, including an object type from a plurality of different object types.

14. The controller according to claim 1, wherein the memory further includes instructions executable by the microprocessor to cause the controller to:

operate at least one vehicle function of the vehicle including at least partly automated driving of the vehicle based on the ascertained object distance and/or based on an occupancy grid of the surroundings of the vehicle that depends on the ascertained object distance.

15. A method for ascertaining information in relation to an object in surroundings of a vehicle, comprising:

ascertaining image data of a camera of the vehicle, wherein the image data indicate surroundings of the vehicle proceeding from a reference point;

detecting at least one camera object in the surroundings of the vehicle based on the image data;

ascertaining sensor data of a distance-sensing surround sensor of the vehicle, wherein the sensor data indicate a multiplicity of detected points in the surroundings of the vehicle;

displacing the camera object, during the superpositioning of the image data and the sensor data, to a multiplicity of different distances relative to the reference point, and scaling the camera object at each of the different distances;

ascertaining a multiplicity of values of an amount of overlap of the respective camera object with detected points of the sensor data for the multiplicity of different distances; and ascertaining an object distance of the camera object from the reference point on the basis of the multiplicity of values of the amount of overlap;

ascertaining an azimuth angle range and/or height angle range, around the reference point for the camera object;

wherein displacement of the camera object is performed within a portion of the surroundings of the vehicle defined by the angle range along a ray emanating from the reference point; and ascertaining a value of the amount of overlap of the respective camera object exclusively with detected points of the sensor data from the portion of the surroundings of the vehicle;

wherein the scaling is performed during the superpositioning at each of the different distances such that the camera object always remains within the rays delimiting the angle range.

\* \* \* \* \*